Aug. 25, 1953 F. M. VARNEY 2,650,030
HEAT SUPPLY CONTROL
Filed Nov. 21, 1949

INVENTOR
FRANK M. VARNEY
BY Almon S. Nelson
ATTORNEY

Patented Aug. 25, 1953

2,650,030

UNITED STATES PATENT OFFICE 2,650,030

HEAT SUPPLY CONTROL

Frank M. Varney, Roanoke, Va.

Application November 21, 1949, Serial No. 128,578

1 Claim. (Cl. 236—46)

This invention relating as indicated to a heating system is more particularly directed to a means for controlling the supply of fuel whether it be solid, gaseous or liquid. The invention may be used with hot water heating systems, as well as hot air or steam or vapor systems. In order to shorten the description, however, reference will be made to a stoker fired hot water system, but this is not intended as a limitation upon the invention as the invention may be applied to the control of any heating medium such as steam. For example, it is applicable to milk pasteurizing apparatus and other similar apparatus.

It is a particular object of the invention when applied to a stoker to interrupt the stoker operation at frequent intervals and for various periods, the number of interruptions and the length of such interruptions, measured in time, being controlled by the temperature of the heating medium which in the preferred example is the water in the boiler.

It is a further object of the invention to eliminate over heating by interrupting the heating operation of the heating apparatus at frequent intervals and in various cycles, the number of interruptions and the duration of such measured in time, being controlled by temperature. Continuous operation of a heating apparatus from the time the heating starts until it is stopped by a predetermined setting of the temperature control (usually a room thermostat) builds up a reserve supply of heat in the heating apparatus causing overheating and waste of fuel. My invention is specifically designed to avoid overheating and its consequent waste.

Another object of the invention is to prevent overheating of a boiler and heating plant equipped with a summer-winter hookup. Such installations provide domestic hot water the year round. In this type of heating plant overheating is almost impossible to overcome with the conventional type of controls. Summer-winter heating systems are equipped with a thermostat, controlled circulating water pump and a flow valve. When the thermostat is satisfied it stops the circulator and the flow valve closes leaving no way to dissipate the heat except by the domestic hot water load. A continuous run of the stoker from the time the boiler control starts it until it stops it, builds up such a fuel supply in the boiler fire box that it makes the boiler temperature rise very fast, which overheats the boiler to the point where the high limit control automatically starts the circulator again to relieve the excess boiler temperature. This pumps hot water into the space to be heated when not needed. Sometimes a heating plant goes through several of these overheating cycles before the excess heat is dissipated from the fuel in the fire box after a shut down of the stoker.

My invention eliminates the above disadvantages since it starts cycling the interruptions of the fuel feeding into the boiler as the temperature begins to climb, giving the stoker longer interruptions per cycle as the temperature of the heating medium climbs so that when the thermostat is satisfied the deposits of fuel in the fire box are at a minimum.

It is another object of the invention to provide a control to be mounted in a relatively small cabinet or box containing a temperature actuated mechanism, a rotating means that turns a cam approximately one revolution per hour and a switch whose wires are employed to interrupt the operation of the heating apparatus. These wires are connected into the thermostat, boiler limit or operating control circuit. The only other installation is a connection between the temperature actuated mechanism and a heat responsive bulb which can be placed in the heating device, the boiler circulating loop or strapped to it.

It is a further object of the invention to provide a control with a minimum number of parts so that the cost thereof is exceedingly small.

A still further object of the invention is to provide a control wherein no manual adjustment is necessary, this control operating continuously and automatically.

A general object of the invention is to provide a cam member which is bodily movable toward and away from a switch so that contact of the switch with the cam makes and breaks the circuit which the switch controls, by braking the circuit for short intervals.

Another object of the invention is to save fuel by permitting the heating plant to have a combination of forced and natural heating, which permits the heating apparatus to absorb the heat better, which reduces the heat and stack losses, increases the efficiency and burning of the fuel, leaving a minimum size fuel bed and heat in the combustion chamber of the heating apparatus, thus preventing overheating of the heating apparatus and space to be heated.

A more detailed object of the invention is to provide a stationary switch mount having a movable switch arm which contacts the movable faces of a cam member.

Another specific object of the invention is to provide an alternative construction from that described in the preceding paragraph, wherein the switch mount is also stationary but the cam is bodily movable toward and away from a movable switch arm.

Another object of the invention is to automatically give oil and gas burners operating cycles after a shut down to prevent a condition called "cold seventy."

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 1:
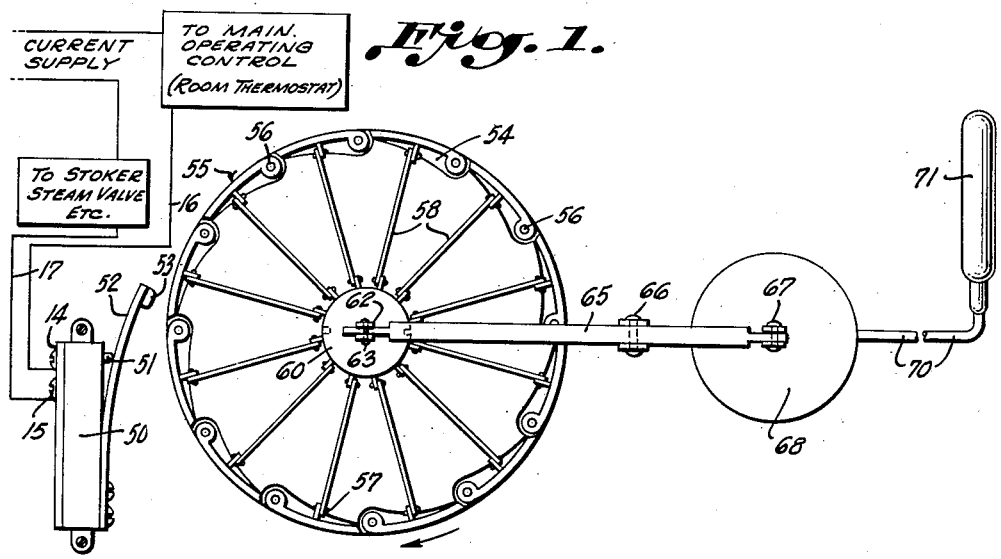
Fig. 1 is a diagrammatic view of one form of the invention.

Referring now to the drawings, and particularly Fig. 1, it will be seen that I have provided a bulb 71 which is adapted to be inserted in the boiler of a heating system. This bulb communicates with a bellows 68 by means of pipe 70, the bulb and bellows preferably containing a heat expansible fluid. The bellows is mounted in any desired manner.

Wire 16 is connected to screw 14, this wire leading from the operating control (not shown) which may obviously be placed in any desired position. The other wire 17 leads from screw 15 to the heating device so that when the cam contacting member 53 is pushed to the left as viewed in Fig. 1, the button 51 is depressed and the circuit is broken between lines 16 and 17. Arm 52 extends upwardly from the switch, this arm preferably being formed of spring metal and being adapted to engage cam faces 55 on the cam plate.

The switch 50 is stationarily mounted and the cam faces 55 are pivotally mounted.

Figure 2:
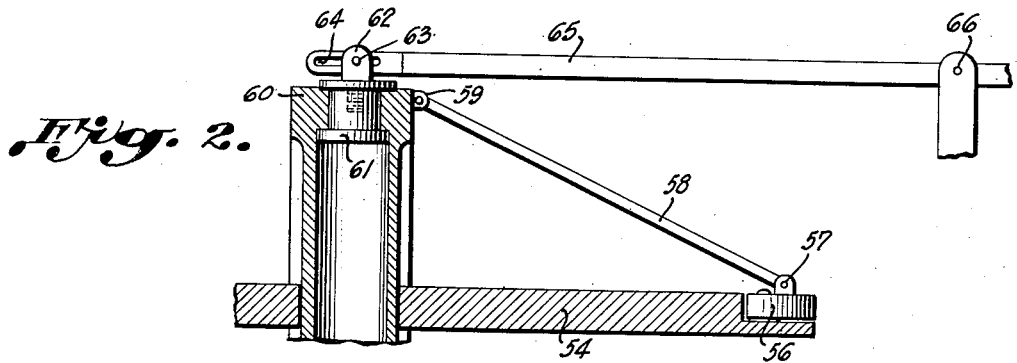
Fig. 2 is a partial central section of Fig. 1.

The cam plate 54, actuated by some such means as a clockwork mechanism (not shown) is mounted upon shaft 60 (see Fig. 2), the shaft being slidable axially with respect to the cam plate, the cam plate being maintained in a plane by means not shown. A series of links 58 are pivoted at 59 to the shaft 60, these links being pivoted at 57 to each of cam members or movable cam faces 56. A sleeve 61 is seated in the outer end of shaft 60, this sleeve being provided with a clevis 62, the clevis having a pin 63 extending therethrough. The pin 63 slides in slot 64 in link 65, and the link 65 is pivoted at 66 to a supporting bracket. A bellows 68 is connected by means of the pin 67 to the link 65. The bellows 68 communicates with the bulb 71 by means of the conduit 70.

In operation, the temperature in the heating apparatus upon rising, causes fluid in bulb 71 to expand, thus expanding bellows 68. This expansion causes shaft 60 to slide downwardly as viewed in Fig. 2 and this, in turn, causes the links 58 to force cam faces 55 outwardly. The button 51 at this stage has not been depressed and the circuit continues through lines 16 and 17 to operate the stoker or heating apparatus. In the meantime, the cam plate 54 is revolving and when the cam face 55 contacts switch arm 52 the button 51 is depressed, thus breaking the circuit to the stoker or heating apparatus and interrupting the operation thereof. This interruption will continue until one of the cam faces 55 has passed beyond the upper end of switch arm 52, whereupon switch arm 52 will assume the position shown in Fig. 1. This causes the button 51 to move outwardly again making the circuit to the stoker of heating apparatus. It will be noted that the length of the interruption as well as the frequency of interruption, is automatically controlled by the temperature of the boiler water. This is due to the provision of means controlled by such temperature to vary the distance between the switch arm 52 and cam faces 55. Thus it will be seen that in this embodiment, the cam faces are moved, whereas in the succeeding embodiment, the whole cam is bodily moved.

Figure 3:
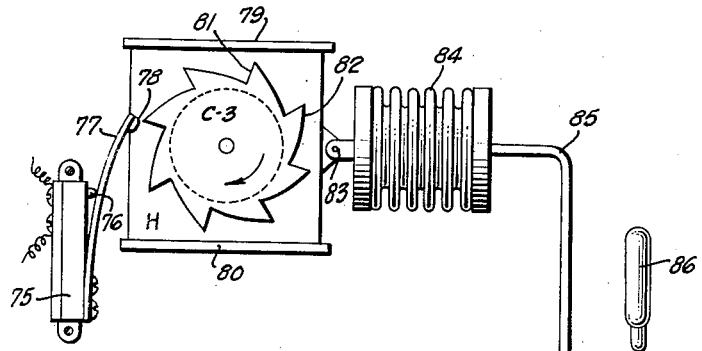
Fig. 3 is a diagrammatic view of a modification.

Referring to the modification shown in Fig. 3, in this embodiment the cam and the cam actuating means reciprocate so as to move the cam faces 82 toward and away from the button 78 on switch arm 77.

The housing H contains a clockwork mechanism or some similar device which will continuously rotate the cam C–3 in a clockwise direction about its axis. The housing and cam move as a unit along the trackways 79 and 80. The bellows 84 is connected to the pin 83 so as to impart movement to the housing H. The bulb 86 is similar to the bulb 71 and is connected to the bellows 84 by the pipe or conduit 85.

In operation, fluid in the bulb 86 expands upon heating and in turn this causes the bellows 84 to expand which moves housing H and cam C–3 to the left as viewed in Fig. 3. As soon as a cam face 82 contacts the cam contacting member 78 the switch arm 77 depresses button 76. This movement opens the circuit thus shutting off current supply to the stoker or other apparatus which is being controlled.

Conversely, upon cooling of the bulb 86 the bellows 84 contracts, sliding the housing H to the right and moving the cam C–3, and particularly its faces 82, out of contact with the cam contacting member 78 on switch arm 77. This closes the circuit. The same effect is obtained when the cam in rotating passes along the cam contacting member 78 until such member reaches the surface 81 whereupon the spring arm 77 moves to the right again closing the circuit to the stoker for example.

While the invention has been described in connection with a stoker it can be used with oil and gas burners and also in other fields. For example, in pasteurizing milk, live steam is fed into the water in the pasteurizer jacket and unless this steam supply is cut on and off intermittently as the temperature rises, the milk will scorch. In this process it is most important that the temperature of the milk rises gradually.

The invention as used in pasteurizing milk would have the actuating bulb 71 or 86 placed in the jacket around the pasteurizer and the temperature control in the milk. In this case the invention opens and closes the steam valve intermittently, shortening the heating periods as the temperature rises.

From the foregoing description, it will be seen that I have provided a heating control wherein interruption of the heating apparatus takes place as the temperature of the heating medium rises or falls. It will also be noted that the circuit can be broken in periods of any desired length and at any desired frequency, depending upon the configuration of the cam faces. It will also be noted that my control is entirely automatic and it is not necessary to make manual adjustments. As far as I am aware, there are no prior constructions involving interruptions of the stoker or heating device performance for longer periods of time as the temperature of the heating apparatus increases and vice versa.

Other modes of applying the principle of my invention may be employed instead of the one explained, change being made as regards the mechanism herein discloses, provided the means stated by any of the following claims or the equivalent of such stated means be employed.

This application is a continuation-in-part of my co-pending application, Heat Supply Control, Serial No. 634,300, which issued as Patent No. 2,488,572 on November 22, 1949.

I therefore particularly point out and distinctly claim as my invention:

A fuel supply control for a heating system, said control comprising a temperature responsive means operated by the heating medium of said system, a snap action switch, a rotating cam member having a series of cam faces, a spring arm on said switch adapted to contact said cam faces, and means actuated by the temperature responsive means to vary the distance between said spring arm and said cam faces by moving the cam faces of said rotating cam member toward and away from said spring arm, the contacts of said switch being closed and thus operating said fuel supply when said spring arm is out of contact with any of said cam faces, said switch contacts being immediately opened when said spring arm is in contact with a cam face and remaining open as long as said spring arm contacts a cam face whereby increase of temperature of said heating medium causes increase in duration of the "off" cycle and decrease in temperature of the heating medium causes increase in duration of the "on" cycle.

FRANK M. VARNEY.

References Cited in the file of this patent

UNITED STATES PATENTS

| Number | Name | Date |
| --- | --- | --- |
| 1,767,636 | Willijelm | June 24, 1930 |
| 2,185,759 | Young | Jan. 2, 1940 |
| 2,291,840 | Spangenberg | Aug. 4, 1942 |
| 2,373,186 | Isserstedt | Apr. 10, 1945 |
| 2,488,572 | Varney | Nov. 22, 1949 |